United States Patent [19]

Binder et al.

[11] Patent Number: 5,045,085
[45] Date of Patent: Sep. 3, 1991

[54] BATTERY EXPLOSION ATTENUATION MATERIAL AND METHOD

[75] Inventors: Richard R. Binder, Menomonee Falls; Paul E. Bantz, Colgate; William H. Tiedemann, Cedarburg; Guy D. McDonald; William J. Wruck, both of Shorewood, all of Wis.

[73] Assignee: Globe-Union Inc., Milwaukee, Wis.

[21] Appl. No.: 369,372

[22] Filed: Jun. 21, 1989

Related U.S. Application Data

[60] Division of Ser. No. 205,411, Jun. 10, 1988, Pat. No. 4,859,546, which is a continuation-in-part of Ser. No. 87,774, Aug. 21, 1987, Pat. No. 4,751,154.

[51] Int. Cl.$^5$ .............................................. H01M 2/12
[52] U.S. Cl. ...................................... 29/623.1; 429/53
[58] Field of Search ................... 29/623.1; 429/53, 57, 429/86, 71

[56] References Cited

U.S. PATENT DOCUMENTS

| | | | |
|---|---|---|---|
| 2,341,382 | 2/1944 | Jensen | 429/86 |
| 2,452,066 | 10/1948 | Murphy | 136/179 |
| 3,042,733 | 7/1962 | Toda et al. | 429/66 |
| 3,561,639 | 2/1971 | Allen | 220/88 |
| 3,650,431 | 3/1972 | Stewart | 220/88 |
| 3,846,178 | 11/1974 | Evjen et al. | 136/166 |
| 4,141,460 | 2/1979 | Stanistreet et al. | 220/88 |
| 4,154,357 | 2/1979 | Sheard et al. | 220/88 |
| 4,169,918 | 10/1979 | Moore | 429/57 |
| 4,447,508 | 5/1984 | Jensen | 429/86 X |
| 4,463,069 | 7/1984 | Greenlee | 429/86 |
| 4,529,674 | 7/1985 | Brooks | 429/71 |
| 4,615,455 | 10/1986 | Tansill | 220/88 |
| 4,751,155 | 9/1990 | Binder et al. | 429/86 |

Primary Examiner—Anthony Skapars
Attorney, Agent, or Firm—E. L. Levine

[57] ABSTRACT

A porous compressible plastic material is inserted into the head space above the cells in a storage battery to attenuate the explosion of combustible gases accumulating therein. The attenuation material is distributed to create a unique bimodal pore distribution, including a major proportion of small pores effective in attenuation and a minor proportion of large pores effective in gas and electrolyte management. Both open cell and fibrous materials may be utilized.

2 Claims, 4 Drawing Sheets

U.S. Patent   Sep. 3, 1991   Sheet 1 of 4   5,045,085
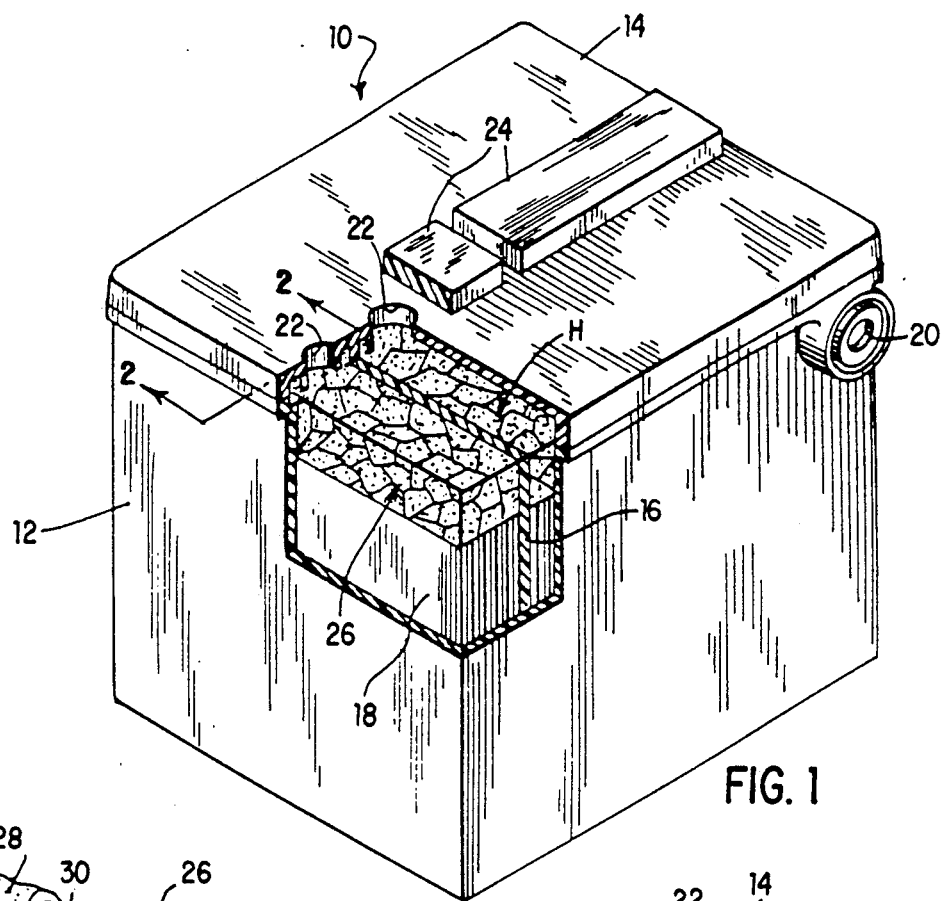
FIG. 1
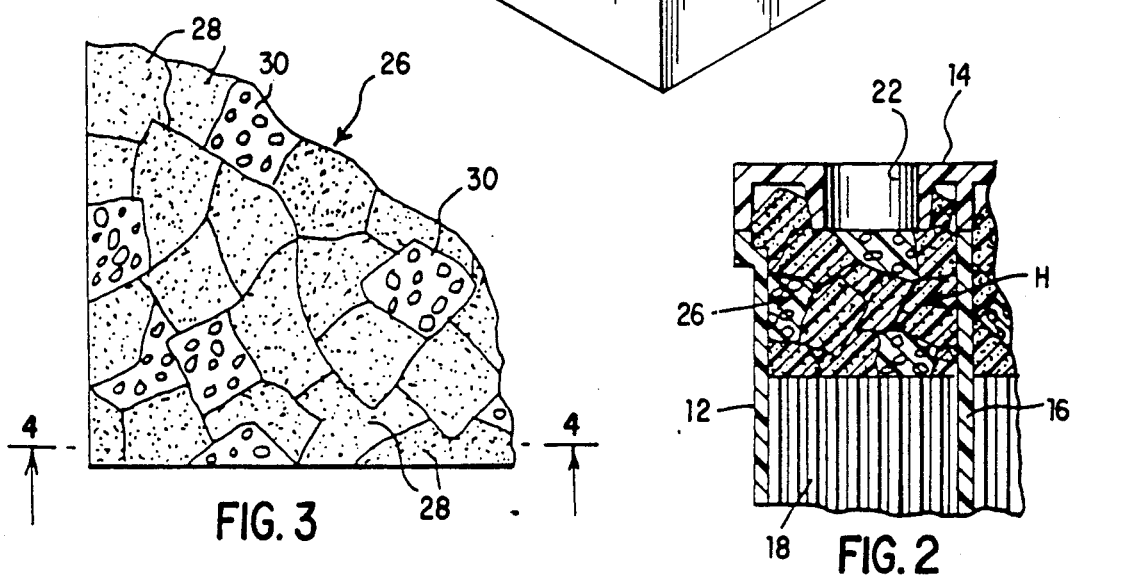
FIG. 3
FIG. 2
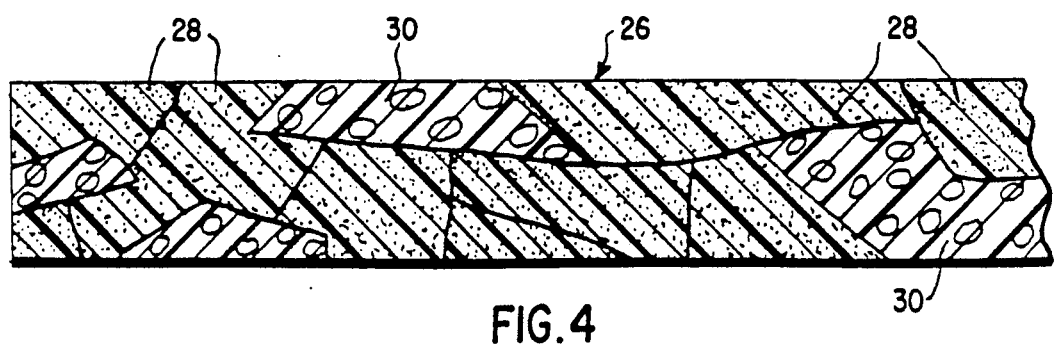
FIG. 4

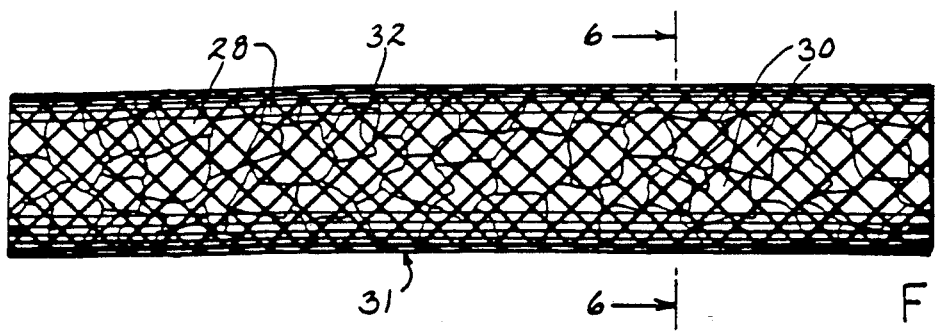
FIG. 5
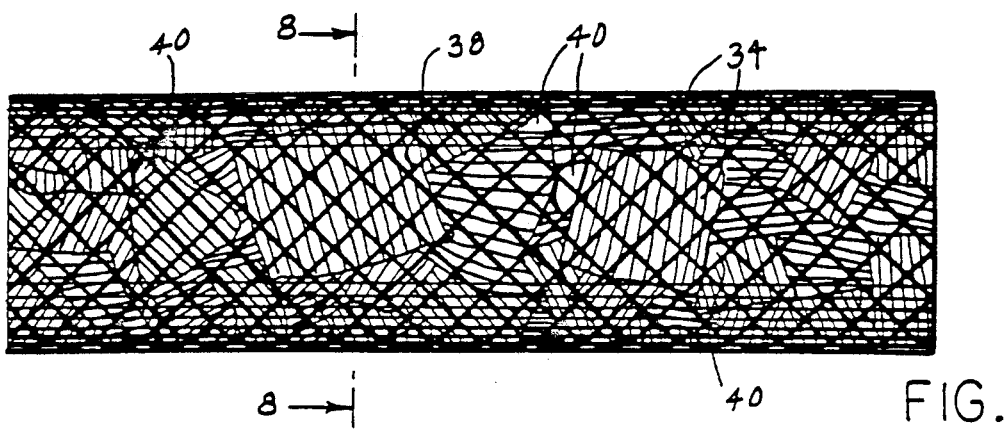
FIG. 7
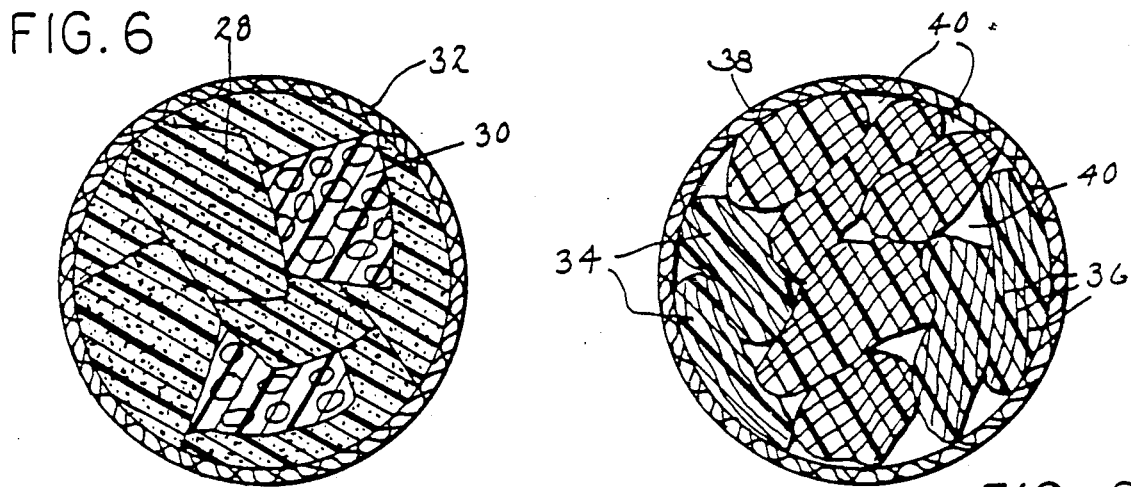
FIG. 6
FIG. 8
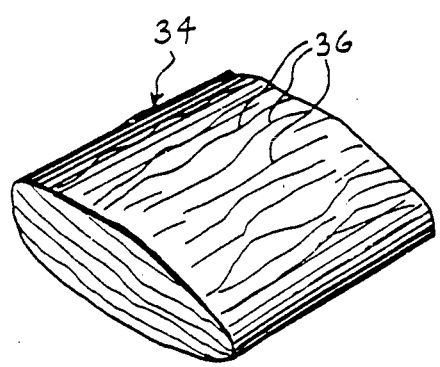
FIG. 9

BATTERY EXPLOSION ATTENUATION MATERIAL AND METHOD

This is a divisional application of co-pending application Ser. No. 205,411, filed June 10, 1988, now U.S. Pat. No. 4,859,546 which is a continuation-in-part of application Ser. No. 087,774 filed Aug. 21, 1987, now U.S. Pat. No. 4,751,154.

BACKGROUND OF THE INVENTION

The present invention relates to electric storage batteries or cells and, in particular, to an improved material and method effective in attenuating an explosion of combustible gases which accummulate in the head space of electric storage batteries.

As is well-known in the art, most types of electric storage batteries generate combustible gases during operation, which gases are either vented from the battery container into the atmosphere or are recombined within the battery in secondary reactions with the active materials. However, even in battery constructions which are intended to provide for the internal recombination of combustible gases, there are certain circumstances, such as inadvertent or abusive overcharge, where the recombination mechanism is ineffective and significant volumes of combustible gases will be generated.

It is also well-known that the combustible gases within the head space of a battery may be accidentally ignited and result in explosion of the battery. The damage and injury resulting from such explosions are well documented. Thus, for many years, effective and reliable means have been sought for preventing or minimizing explosions in batteries and the hazardous effects thereof.

The ignition of combustible gases within the head space of a battery can be caused by either an internal or external ignition source. Combustible gases which are generated within a battery, if not effectively recombined, will eventually create a high enough internal pressure so they must be vented to the atmosphere. The venting is typically accomplished through the use of a simple open vent slot or a one-way relief valve, sometimes referred to as a "burp" valve. During venting of combustible gases an external source of ignition, such as a flame or spark near the battery vent, can result in an ignition which will propagate back into the battery container and result in an explosion. However, improvements in relief valve construction and the development of flame arrestors which are used in conjunction with vents have decreased considerably the incidence of battery explosions caused by an external ignition source, provided such protective devices have not been removed or disabled, or the integrity of the container or cover otherwise breached.

However, should an external source of ignition breach one of the protective devices or should an ignition occur within the container, the combustible gases in the head space may explode. The concentration of gases, typically a mixture of hydrogen and oxygen, and the relatively large volume of the head space can result in an explosion which will shatter the container, cover or other components. In addition, the explosion will also often carry with it the liquid acid or other hazardous electrolyte from within the container.

Thus, it is not surprising that materials and methods for suppressing or minimizing the effects of explosions within batteries have been long sought. It is, of course, axiomatic that elimination of the open head space or substantially filling the head space with a solid material would virtually eliminate the possibility of an explosion simply because the presence of combustible gases would be eliminated. However, neither alternative is acceptable. An open head space is necessary in virtually all secondary storage batteries. First of all, the head space accommodates certain battery components, such as plate straps, intercell connectors, or terminals. In addition, in batteries which utilize free liquid electrolyte, sometimes referred to as "flooded" systems, open head space is necessary to accommodate variations in the level of the electrolyte as the battery is cycled or to provide space for acid movement under extreme conditions of use, such as abusive overcharge. Also, the head space accommodates movement of the electrolyte level as the battery is tilted in service, such as the ability to operate an automobile on an incline without loss of electrolyte.

For many years, it has been known to fill the head space in a battery or cell, either partially or totally, with a porous material to inhibit the explosion of gases within the head space and quench any flame which may be formed, while still allowing the movement of gases and electrolyte through the material. For example, U.S. Pat. No. 2,341,382 discloses partially filling the head space with a loosely packed material, such as crushed stone or glass, diatomaceous earth, or glass wool. The disclosure in that patent suggests that the loosely packed filler material will not prevent the explosion of gases entirely, but by dividing the head space chamber into many minute interconnected cells, a rapid total combustion of the gases is prevented and, instead, a series of weak and inconsequential minor explosions will occur until the flame is quenched. It is believed that the general theory set forth in that patent, sometimes called the "chain termination" theory, is essentially correct and valid for a large variety of porous filler materials. However, notwithstanding the soundness of the theory and the development in the ensuing years of many improved porous materials, particularly plastics, there has been no large scale or general implementation of the technology. Thus, there still exists in the battery industry today a serious need for a material and method of utilizing it which will effectively attenuate hazardous explosions, but will otherwise not be detrimental to safe and efficient operation of the battery.

There are a number of factors which are believed to have generally inhibited or prevented the practical and useful application of explosion suppression or attenuation technology in batteries. Broadly, these factors include the creation of other hazards and detrimental effects on battery performance. As the head space of a battery is filled with a porous material, there will be a decrease in the actual remaining void volume in the head space inversely proportional to the porosity or effective void volume of the filler material. In other words, the more solids present in the filler material, the greater will be the reduction in the total head space volume filled with such material. As indicated above and particularly in flooded batteries, the loss of actual open head space volume will lessen the space available for electrolyte movement or electrolyte level variations.

It is known that high rate charging or excessive overcharge can result in vigorous gassing in many types of batteries. If the gas bubbles formed in the electrolyte cannot find ready and fairly direct channels to the battery vent openings, electrolyte may be upwardly displaced and overflow through the battery vents. This condition is known as electrolyte "pumping" and the damaging and hazardous effects of a corrosive electrolyte flowing out of a battery are obvious.

Electrolyte pumping can also occur even where the head space of the battery is filled with a very highly porous material, i.e. a material having a high void volume. For example, an open cell foam material may have a void volume as high as 97 to 98% and, if placed in the head space of a battery, will only occupy about 2 or 3% of the total volume thereof. Nevertheless, in a flooded battery, such a material may readily retain electrolyte and not allow it to drain back into the battery by gravity. Electrolyte so retained in a porous filler material will be readily pumped from the battery under the conditions of vigorous gassing, described above.

In addition, if a relatively large volume of electrolyte is drawn from the cells through wicking by a porous material in the head space or if the porous material otherwise retains the electrolyte with which it comes into contact, insufficient electrolyte may remain in the cells for proper electrochemical reaction and operation of the battery. Also, any material to be used as an attenuation material in batteries must possess certain other critically necessary physical properties. Such materials must have adequate resilience to retain their shape and to readily fill sometimes irregular shape of battery head space. The material must also be thermally and chemically stable in the operating environment within the battery. To provide adequate safety, any attenuation material must be able to survive repeated ignitions without melting or sintering. A material capable of effectively operating only once, but being destroyed in the process, would not be satisfactory. The material cannot, of course, dissolve in or otherwise react with the liquid electrolyte.

A number of porous plastic materials have been used in fuel tanks or similar containers as a means for reducing the explosion hazards. Both fibrous and cellular plastics of various kinds are disclosed in the art. U.S. Pat. No. 3,561,639 discloses the use of a single block of open cell polyurethane foam to fill the interior of a fuel tank. The described material has a reticulated or fully open pore structure, a pore size ranging from 10 to 100 pores per linear inch (ppi), and a void volume of 97%. The fully reticulated structure is described as important to keep flame propagation from reaching the velocity necessary for explosion and to provide a high degree of permeability for the liquid fuel. A material used today for explosion safety in jet aircraft fuel tanks is an ether-base polyurethane foam having a pore size of 20 ppi which is produced by Scott Foam and sold under the name "Protectair".

Bulked fibrous plastic materials of many types have also been proposed for use as a means of arresting flames and reducing explosion hazards in fuel tanks. The filamentary plastic materials proposed for such use include polyolefins, nylon, dacron, polyesters, acrylics, and polyurethanes, as well as others. The materials are typically bulked or textured to provide high porosity and void volume by any of many well-known methods such as twisting, looping, crimping, needle punching and so forth. Examples of various types of such materials are described in U.S. Pat. Nos. 3,650,431, 4,141,460, and 4,154,357.

Notwithstanding the broad use of the foregoing porous plastic materials to suppress explosions in fuel tanks, we are unaware of any effective use of these materials in storage batteries and, in particular, as an explosion attenuation material in the open head space of such batteries. As a result of extensive testing, we have found as a general matter that the materials which perform most effectively to attenuate an explosion and quench the flame resulting from the ignition of combustible gases, do not perform well in other aspects of battery operation. As previously indicated, the violence of an explosion (in terms of the peak pressure developed within the open head space of a battery) can be reduced by substantially filling the head space with a porous material. Small spaces not effectively filled with the porous material and within which combustible gases are ignited will result in minor pressure perturbations. Certain porous materials will attenuate the violence of the explosion and eventually quench the flame. We have found that the pressure developed during an explosion is reduced as the pore size of the attenuation material is decreased. Unfortunately, as the pore size of the material decreases, the adverse effects of the material on battery performance increase. The smaller the pore size of the material, the greater the propensity of the material to wick up electrolyte or to retain within the pores electrolyte with which it is wetted. Electrolyte which is retained in the pores and cannot drain back into the cell can result in two serious problems, as previously mentioned. First, electrolyte retained in the porous material is not readily available for electrochemical reaction and may thus result in diminished electrical performance. Retained electrolyte will also inhibit the flow of gases generated within the battery and, in certain circumstances of operation, result in electrolyte being pumped out of the battery through the vent openings.

SUMMARY OF THE INVENTION

The present invention is directed to an improved porous plastic material which has a unique bimodal pore distribution including a major proportion of the small pores most effective in explosion attenuation and a minor proportion of large pores which are required to accommodate gas and/or electrolyte movement within and through the head space during battery operation. The unique bimodal function may be provided by using a single porous material, properly prepared and installed, or by using a composite of two different porous materials. Furthermore either filamentary or open cellular materials may be used.

In one embodiment of the invention, which has been found to be particularly suitable for use in secondary alkaline systems, a single material comprising small pillows of lofted, non-woven polyprolylene fibers is used to fill the open head space in each battery cell. The material in each of the pillows provides the small pore or microporous structure effective in the attenuation of explosions and the random orientation of the numerous small pillows used to fill the head space results in the large pore or macroporous structure required for proper gas and electrolyte management. By packing the polypropylene fiber pillows rather loosely within the head space or with only a slight amount of compression, the macroporous structure between adjacent randomly oriented pillows provides adequate open space for the venting of gases generated within the battery and the passage or drain back of any mobile electrolyte.

A compressible open cell plastic material may also be used to provide a similar bimodal porefunction. Polyurethane foam material may be cut or chopped into small, and preferably uniformly shaped, pieces with which the head space of the cell is filled in a somewhat loosely packed fashion. The bimodal pore function is provided in a manner similar to the polypropylene fiber material previously described. Thus, the small pore open cell structure of the foam provides the attenuation/quenching function and the spaces or large pores between the pieces provide the open spaces for gas and electrolyte movement.

In a preferred embodiment of the invention, the bimodal pore distribution is provided by a composite of two different porous, compressible plastic materials. A composite of two different types of open cell polyurethane foam has been found to be particularly effective. The small pore component of the composite material comprises a non-reticulated polyurethane foam with a pore size of 60 ppi. The large pore component of the composite comprises a reticulated polyurethane with a pore size of 20 ppi. The composite is a blend of uniform small pieces of the two materials, preferably having a ratio of small pore to large pore pieces of about 3 to 1.

The composite bimodal material of an embodiment is preferably installed in the open head space of a battery cell so that it is retained therein in a compressed state, e.g. about 20% compression. Maintaining some compression on the composite foam provides two separate benefits. If the material is maintained in compression within the head space, the inherent resilience of the polyurethane foam will tend to cause it to fill the entire open volume of the head space before it has reached its free, fully expanded state. This helps assure there will be no significant open volumes within the head space which would allow an explosion or pressure build-up of more than minor and insignificant proportions to occur. In addition, it has been shown that open cell foams maintained in compression attenuate explosions better (result in lower peak pressures) than the same material in a free, uncompressed state. The composite bimodal polyurethane foam material is particularly effective as an explosion attenuation material in flooded lead-acid batteries.

In another preferred embodiment the bimodal pore distribution is provided by a plurality of elements or pillows of needle punched polypropylene each having a bonded segment. The pillows are randomly and loosely held within a netting to form a subassembly which is readily insertable into the head space of the battery. The bonded segments collectively form a number of relatively large pores which accommodate movement of the generated gases and the electrolyte through the head space. The bulked portions of the pillows collectively form a greater number of relatively smaller pores which are effective to limit the peak pressure within the battery in the event of ignition of the gases.

The materials providing the unique bimodal function disclosed herein, whether of single or composite construction, provide the capability to safely attenuate explosions in a wide variety of storage batteries without inhibiting their electrical performance or creating additional operational hazards. Various materials may be selected and optimized for use in either acid or alkaline electrolyte systems.

BRIEF DESCRIPTION OF THE DRAWINGS

FIG. 1 is a perspective view of a storage battery with portions of the cover and container broken away to show a typical loading of the attenuation material of the present invention in the head space of the battery cells.

FIG. 2 is an enlarged sectional view taken on line 2—2 of FIG. 1.

FIG. 3 is an enlarged top plan view of the attenuation material in FIG. 1, showing the preferred bimodal composite construction utilizing open cell foam material.

FIG. 4 is an enlarged sectional view of the bimodal material of composite construction taken on line 4—4 of FIG. 3.

FIG. 5 shows the composite bimodal attenuation material packaged for insertion in the head space of a cell.

FIG. 6 is an enlarged sectional view taken along line 6—6 of FIG. 5.

FIG. 7 shows an alternate embodiment of an attenuation material made from a single type of bulked filamentary plastic.

FIG. 8 is an enlarged sectional view taken on line 8—8 of FIG. 7.

FIG. 9 is an enlarged perspective view of a single pillow of the attenuation material shown n FIGS. 7 and 8.

DETAILED DESCRIPTION OF THE PREFERRED EMBODIMENTS

Figures 10, 11:
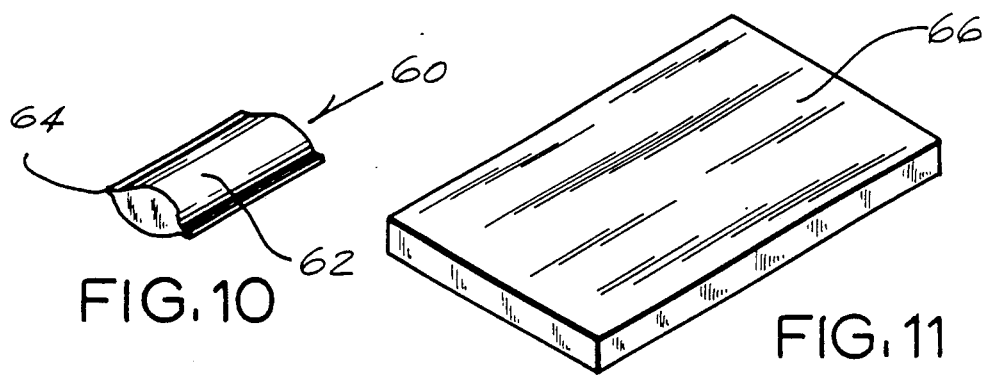
FIG. 10 is a perspective view of a pillow element in accordance with a preferred embodiment of the invention.
FIG. 11 is a perspective view of a bulked polypropylene mat.

Referring to FIG. 1, a storage battery 10 includes the container 12 and cover 14. The container and cover are typically made of injection molded polypropylene and have average wall thicknesses of about 0.1 inch. The container 12 is divided into a series of cells by integrally molded intercell partitions 16. Each cell contains an electrode element 18 constructed of a stack of alternating positive and negative plates spaced apart by insulating separators, all in a manner well known in the art. The electrode elements 18 within each cell also include the typical lug and strap connectors, not shown, and adjacent electrodes are series connected through the cell partition 16 with appropriate conductive intercell connectors, also not shown, but comprising conventional constructions well known in the art. The end cells of the battery 10 also include connections to the exterior terminals 20 through the container wall, as shown, or through the cover 14 in the case of top terminals.

The cover 14 includes a series of vent/fill holes 22, one for each cell. The vent/fill holes 22 are closed with vent cap assemblies 24 which may be fixed or removable. The vent cap assemblies 24 typically include downward depending vent plugs which substantially seal the holes 22, but are provided with small holes or passages to allow gases generated within the cell to vent to the atmosphere. The vent assembly 24 also typically includes a microporous flame arrester adjacent each hole 22 through which gases may vent, but which is intended to prevent an external flame or ignition source from propagating back into the cell of the battery. The foregoing construction is typical and the various elements need not be shown for an understanding of the invention.

In the assembly of a typical lead-acid battery of the foregoing construction, the assembled electrode elements 18 are placed in the cells of the battery, the intercell connections between adjacent electrode elements are made through the partitions 16 (and, depending on the type, the terminal connections may also be made), and the cover 14 is sealed to the container 12. Each of the cells is filled with a sulfuric acid electrolyte to a level slightly above the tops of the electrode elements 18 and the battery is formed by electochemically converting lead oxide material in the positive and negative plates to lead dioxide and lead, respectively.

Except for the space occupied by the plate straps, intercell connectors and terminal assemblies, previously mentioned, the space within each cell above the top of the electrode element 18 and below the underside of cover 14 is generally open. This open head space, designated generally by the letter H in FIGS. 1 and 2, but shown occupied by the attenuation material to be hereinafter described, may have a volume of 20 to 25 cubic inches (325 to 410 cubic centimeters) per cell in a typical 6-cell 12 volt battery.

The hydrogen and oxygen gases, which are generated as a result of the electrochemical reactions within the cell, pass upwardly through the electrolyte, between the plates and separators of the electrode element 18 and accumulate in the head space H, until a sufficient positive pressure is established to cause the gases to vent through the vent holes 22 and past the flame arrestors or other venting construction in the vent caps 24. The gas mixture is, of course, highly explosive and, as is well known, an ignition of such gases accumulating in the open head space will result in an explosion which can easily shatter the container and/or cover, as well as other elements connected thereto. In addition to destroying the battery, the potential personal danger from exploding battery pieces and acid electrolyte is well known. Because of the need to accommodate certain structural components of the battery and to provide space for electrolyte level fluctuations, the head space in batteries must be maintained.

In an embodiment of the present invention, the bimodal pore distribution which is necessary for effective attenuation and gas/electrolyte management, is provided in a composite of two different types of open cell polyurethane foam materials. Referring also to FIGS. 3 and 4, the composite attenuation material 26 is comprised of small, randomly oriented small pore pieces 28 and large pore pieces 30. The small pore pieces 28 are most effective in the attenuation of explosions and the large pore pieces 30 provide the open space for backflow of the electrolyte and movement of the exiting gases to the vent holes 22.

One blend of foam materials which has been found to provide a particularly effective composite comprises 75% small pore pieces 28 of Scott Foam C100-30 and 25% large pore pieces 30 of Scott Foam "Protectair". Both materials are ether-based polyurethane foams, however, the small pore material is non-reticulated and the large pore material is fully reticulated. The basic distinction between the two is that, in non-reticulated foam, not all of the cells are fully open although the material is permeable. In a reticulated foam, the cell membranes of bubbles are completely broken or open, resulting in higher permeability. The small pore pieces have a pore size of 60 pores per inch (ppi) and the large pore pieces have a pore size of 20 ppi.

The composite bimodal pore material 26 may utilize cut or chopped pieces of the foam materials 28 and 30 of any convenient size or shape. The composite material, in a random distribution of pieces, may be loaded into the open head space H of each battery cell in any convenient manner which will assure that the head space is substantially completely filled with the material 26. These polyurethane foams are highly compressible and resilient and, therefore, inserting the material into the head space under some precompression and allowing it to expand within the head space will help assure complete filling. Using smaller pieces 28 and 30 also enhances complete filling. Foam pieces nominally $\frac{1}{2}$ inch in size have been found to work satisfactorily.

There are a number of methods and related apparatus which have been found to be particularly unique and useful in preparing these explosion attenuation materials for and loading them into the battery cells. Some of these methods and apparatus will be described briefly hereinafter and, with other alternative methods, are more fully disclosed and claimed in the commonly-owned copending application of Binder et al, entitled "Method and Apparatus for the Preparation and Installation of Battery Explosion Attenuation Material", U.S. Ser. No. 092,043, filed Sept. 1, 1987, hereby incorporated by reference.

It has been found that by maintaining the composite material 26 in a state of compression within the head space ranging, preferably, from 5 to 20%, substantially complete filling of the head space and optimum bimodal performance are attained. The small pore pieces 28, with a pore size of 60 ppi, operate to attenuate explosions very effectively in an uncompressed free state, but are even more effective when maintained in compression. A study of the attenuation mechanism suggests that the small pore open cell foam inhibits and prevents the complete reaction of the total volume of gases present in the head space. The multiple open cell paths provided in the foam material slow the rate of ignition and explosion and eventually act to quench the flame before complete combustion of the gases has occurred. Small, inconsequential explosions or "pops" have been seen to occur in the portions of the head space not completely filled with the porous material. The pressure developed by these minor explosions, however, is relatively insignificant and, if the attenuation material is properly prepared and installed, such explosions have been found to cause no damage to the battery container, cover, or the internal battery structure.

The large pore pieces 30 of the composite material 26 provide the needed open pore space to allow the generated gases to pass relatively uninhibited from the electrode elements 18, through the attenuation material 26, and out the vent openings 22. Gas movement may be further inhibited by liquid electrolyte retained in the pores of the attenuation material and effectively blocking the paths available for gas movement. The large pore material 30 does not tend to retain acid and allows the acid to drain back readily into the cell. This is especially important to prevent electrolyte from being pumped out of the battery through the vent openings, especially when a battery is being charged. If the pores of the attenuation material are filled with electrolyte, vigorous gassing which occurs, for example, during high rate overcharge, will pump acid from the battery. Thus, the large pore material provides the necessary drainback of acid electrolyte and open paths for flow of gases. The open and relatively unrestricted flow paths provided by the large pore material 30 is also important to allow safe and relatively unrestricted filling of the cells with electrolyte after initial assembly of the battery.

The dispersion of large pore pieces 30 both horizontally (FIG. 3) and vertically (FIG. 4) throughout the composite material 26 is intended to insure that there are a sufficient number of completely open interconnected large pore channels. On the other hand, it is desireable to keep the percentage of large pore material at a minimum since it is less effective than the small pore material in attenuating explosions. However, it is believed that fairly wide variations may be made in the components of the composite material 26 while still providing effective attenuation and electrolyte/gas management. Thus, changes in the pore sizes, ratios of the two component materials, relative sizes of the pieces, and the compression with which the material is held in place may be made.

Various methods may be used to prepare the composite attenuation material for loading into the head space of a battery and to facilitate its loading and proper ultimate positioning therein. Referring to FIGS. 5 and 6, an appropriate blend of large and small pore foam pieces may be compressed and rolled into a cylindrical shape and retained in compression by a mesh or net 32 of suitable material, such as nylon. A cylinder 31 of compressed composite material is placed in the head space of each cell over the electrode element 18 prior to placing the cover 14 on the container 12. The nylon net 32 is soluable in sulfuric acid and will dissolve in a short time after the battery is filled with electrolyte. Dissolution of the net will result in expansion of the compressed composite material to completely fill the head space. By appropriately controlling the size of the compressed cylinder 31 and the degree of compression of the porous material, in consideration of the size of the head space to be filled, substantial variations in the compression with which the material is ultimately held in the head space may be attained.

FIGS. 7 through 9 show an alternate embodiment of an attenuation material utilizing only a single type of porous compressible plastic. The material is nevertheless able to provide the same bimodal function as the composite material of the preferred embodiment. The material comprises randomly oriented pillows 34 of lofted non-woven polypropylene fibers 36 which are placed within and fill the battery cell head space in a manner similar to the composite material of the preferred embodiment. One type of lofted or bulked polypropylene material which has been found to be effective is made of 15 denier fibers and, in a mat 0.56 inch thick, weighs 6.2 oz./sq. yd.

However, the pillows 34 are less tightly compressed and, in their final orientation within the head space, provide a bimodal pore distribution in a somewhat different manner. The small pore or microporous distribution effective to attenuate explosions is provided by the bulked fibrous material. The large macropore distribution needed to accommodate the flow of gases and electrolyte through the material is provided by the open spaces or channels 40 between the randomly oriented pillows 34.

When using a single type of porous material and relying on the spacing between the pieces to provide the desired macroporosity, it is important that the material not be too tightly compressed so that the channels 40 are eliminated. However, in order to facilitate handling and loading of the material, it is still desirable and possible to enclose the randomly oriented pillows 34 within a net 38 and under some slight amount of compression. Upon ultimate dissolution of the net 38 by the electrolyte within the cell (in the same manner previously described with respect to the composite material shown in FIGS. 5 and 6), the material may be allowed to expand to its essentially free state to provide adequate large pore channels 40. Nevertheless, the initial compression with which the material is bound will enhance handleability and loading into the cells and the subsequent expansion in situ to substantially fill the head space. Also, choosing an initial compression and/or amount of material which will result in retaining some level of compression in the material after expansion in the head space serves to insure against loss of fill through settling or compaction of the material.

The fibrous polypropylene has been found to be particularly well suited for use in a wide variety of flooded secondary systems, both acid and alkaline. Polypropylene is, of course, stable and essentially insoluable in aqueous sulfuric acid solutions used in lead-acid batteries. In flooded alkaline systems, typically utilizing an aqueous potassium hydroxide electrolyte, polypropylene is the only useful and commonly available plastic material which will not dissolve or degrade in the alkaline electrolyte or sinter or melt in the presence of a flame. Thus, although a fairly wide variety of cellular and fibrous plastics appear to be suitable for use as attenuation material in lead-acid batteries, polypropylene appears to be the only material, practically suited for use in alkaline systems, considering effectiveness, cost and stability.

The bimodal function, which may be provided with a single type of material such as the polypropylene fibers described above, may also be provided by other plastic materials of a single type. For example, the small pore pieces 28 of open cell polyurethane foam are also effective in providing the necessary bimodal function, if the pieces are properly prepared, sized and installed. For example, filling the head space with randomly oriented cubes of polyurethane foam having a nominal edge dimension of ½ inch (in a substantially uncompressed state), will provide effective attenuation, and the open spaces or channels between the cubes will provide the large macropore function necessary for effective gas-/electrolyte management. In this manner, the cubed open cell polyurethane foam operates in a manner similar to the fibrous polypropylene pillows 34 described with respect to the embodiment shown in FIGS. 7 through 9. The cube shape of the polyurethane foam pieces, when used as the sole type of attenuation material, has been found to work better than pieces of other shapes to provide the dual large/small pore function. Cube shaped pieces tend to assume and maintain a better random orientation, thereby assuring adequate open channels between the pieces for the gas/electrolyte management function. Other shapes of foam materials, such as chopped, shredded or other random sizes will tend to order themselves or pack more tightly and not provide the optimum open channel structure.

In another preferred embodiment of the invention described particularly with reference to FIGS. 10 through 17, a plurality of elements or pillows 60 are inserted randomly and loosely, that is relatively uncompressed, into the head space to create a bimodal pore distribution. The preferred elements 60 are formed of polypropylene in a non woven fabric form which is bulked or lofted. These processes provide a compressible and somewhat fluffy polypropylene. The preferred manner of lofting is needle punching, although other processes such as non woven melt blowing or spray bonding are appropriate. Spray bonding would require use of a glue which is not detrimental to the electrolyte and the electrochemical process.

The pillows 60 include a bulked segment 62 and at least one bonded segment 64. Bonding or crimping of the bulked polypropylene fibers can be performed by a number of processes including ultrasonic bonding, heat bonding and pressure bonding. An appropriate glue can also be used. The bulked segments 62 provide the small pores effective to limit the peak pressure within a battery upon an ignition event. The bonded segments collectively, upon insertion in a battery as described herein, create a network of the large pores sufficient to accommodate movement of the gases and electrolyte through the head space during operation.

A preferred material for forming the elements 60 is needle punched one hundred percent polypropylene having 15 denier fibers in a one-half inch thick mat at a density of 19 ounces per square yard. Such material is commercially available from Textech Industries of Middletown, Conn.

Figures 12, 13:
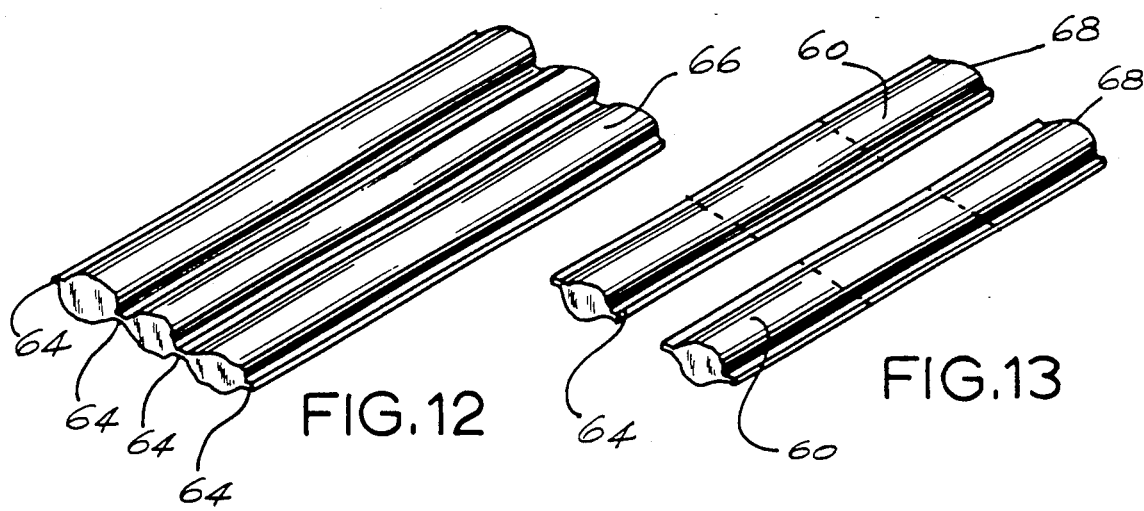
FIG. 12 is a perspective view of the mat of FIG. 11 subsequent to a crimping operation.
FIG. 13 is a perspective view of strips formed by cutting the crimped mat of FIG. 12.

A mat 66 of needle punched polypropylene is shown in FIG. 11. In a preferred process for forming the pillows 60, the mat 66 is ultrasonically bonded at preselected spaced intervals to form the bonded segments 64, as shown in FIG. 12. The bonded segments are approximately ⅛ inch wide. The bonded mat 66 is then cut along the bonded segments 64 to form insert strips 68, as shown in FIG. 13. The insert strips 68 are then cut to form the elements 60, the cuts being made, for example, along the dotted lines shown in FIG. 13. Each bonded segment is approximately 1/16 wide inch after cutting. In the preferred embodiment illustrated, the ultrasonic bonding is performed every 0.9 inch, and the lateral cuts across the bonded segments are also made at 0.9 inch intervals so as to produce pillows 60 which are approximately 0.9 inch square in cross section.

Figures 14, 15:
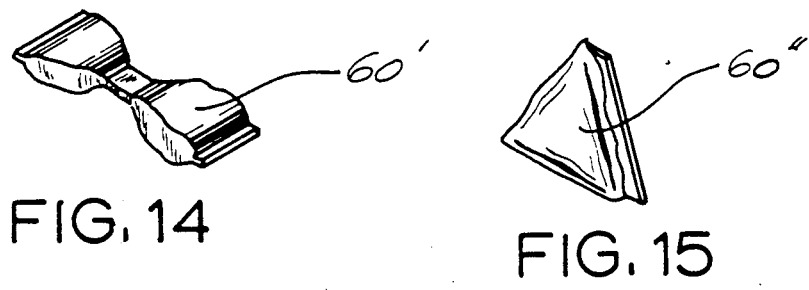
FIG. 14 is a perspective view of a pillow element in accordance with an embodiment of the invention.
FIG. 15 is a perspective view of yet another pillow element in accordance with the invention.

FIGS. 14 and 15 show alternative shapes for the pillows 60. FIG. 14 illustrates pillow 60' formed from a bonded mat 66 of the type shown in FIG. 12. Here, however, the cut into strips is made not along the bonded segments 64, but through the bulked segments 62. FIG. 15 shows a triangular pillow 60" having one edge as a bonded segment. Other geometric shapes are equally possible provided that at least one bonded segment exists to form, collectively with other pillows, the large pores.

Figure 16:
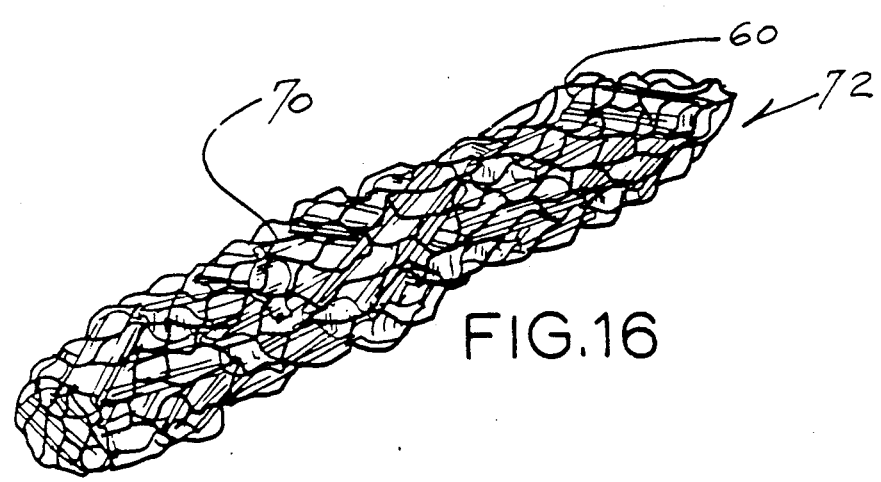
FIG. 16 is a perspective view of a subassembly of pillow elements enclosed within a netting.
Figure 17:
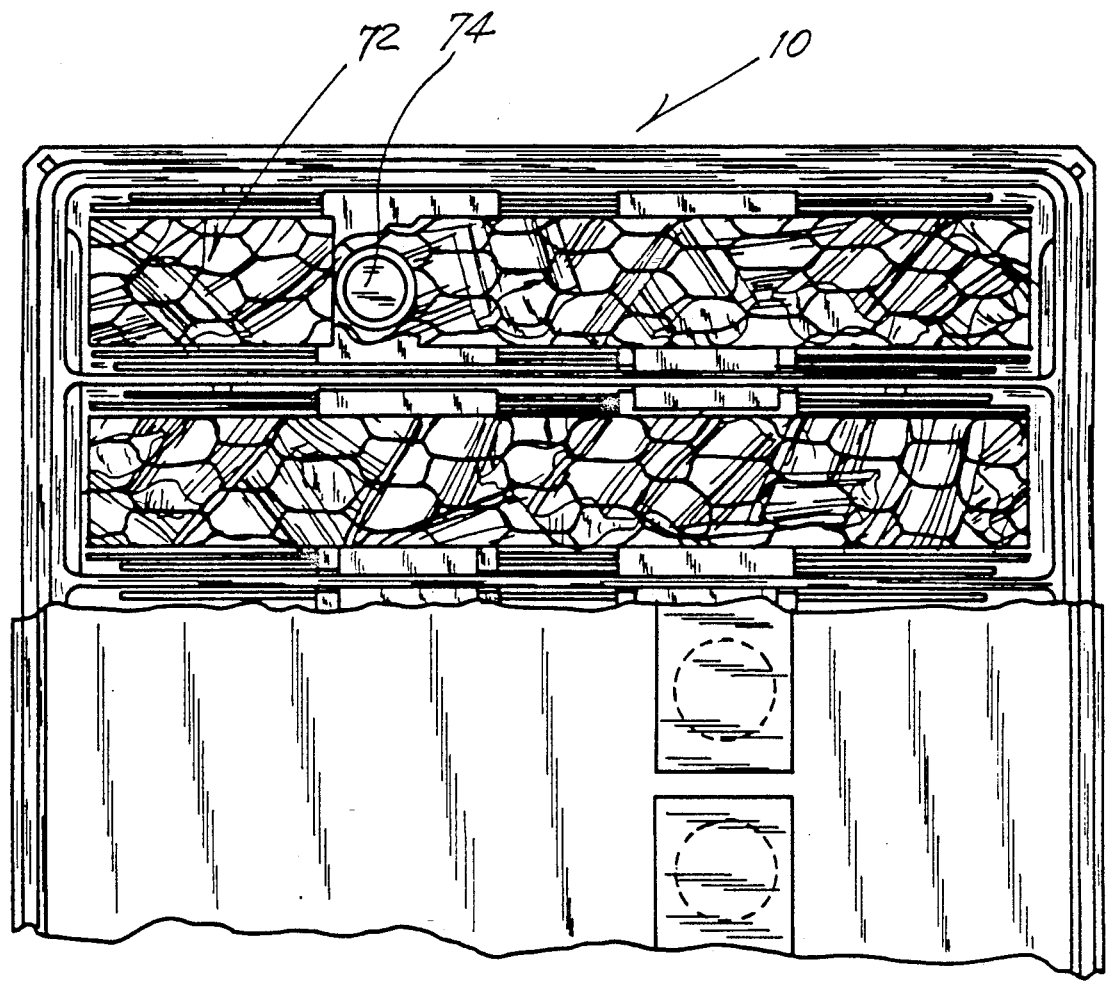
FIG. 17 is a partially cutaway perspective view of a battery including subassemblies of FIG. 16.

Subsequent to formation, the pillows 60 are randomly and loosely loaded into a containing netting 70 to form an attenuating assembly 72 as shown in FIG. 16. The bonded segments 64 help to create a loose packing. The attenuating assembly 72 is sized for insertion into the head space above one cell of the battery 10. The netting 70 is a substantially open mesh preferably made of polypropylene or other plastic material which is not soluable in the electrolyte. Attenuating assemblies 72 are loaded into each cell of the battery, as shown in FIG. 17, before the cover 14 is sealed in place. The packing of the pillows 60 in the netting 70 is loose enough to allow the attenuating assemblies 72 to be loaded into the head space and impaled over a terminal post 74 which extends through the cover in those cells which have a post. If desired for assembly purposes the terminal post 74 may be made of a truncated conical configuration.

In an exemplary battery 10 in accordance with this preferred embodiment, the open head space in one cell is approximately 1.5 inches by 1.5 inches by 6.5 inches, or approximately 14.6 cubic inches. With this size head space, a loading of 15 grams per each such cell, or approximately 1 gram per cubic inch, has been shown to provide consistent pressure attenuation on repetitive ignitions. However, other head space volumes may require other packing densities since this parameter may not scale linearly and is believed to vary with polypropylene fiber diameter. With the exemplary head space, a packing above 21 grams, or approximately 1.4 grams per cubic inch, makes electrolyte management through the large pore spaces more difficult and undesireable.

In order to avoid enlarged volumes within the head space which can collect undesireable pockets of the formed gases, the pillows are preferably packed such that the volume of space external to the pillows is no greater than fifty percent of the total volume of the head space.

It is believed that the crimped configuration of the elements 60 provides an added increment to the heat capacity of a battery attenuation system in accordance with this preferred embodiment. The extremities of the bulked segments 62 nearest to the bonded segments 64 are partially compressed with respect to their bulked state. These partially compressed extremities are believed to retain some electrolyte during battery operation. Upon an ignition, any retained electrolyte will increase the heat capacity of the system and reduce the amount of melting of the individual fibers which can occur.

It has also been found that a small of layering or pulling apart of some of the needle punched fibers can occur. This has not, however, been found to detrimentally impact on the function of the attenuation system.

The use of any of the foregoing materials in both the open cell foam and bulked fiber forms have been shown to provide another benefit when used to fill the head space in a battery. The materials have been found to be very effective in preventing the evolution of electrolyte mist from the battery vents 22 when vigorous gasing occurs. This phenomenon is sometimes referred to as electrolyte "spewing" and is simply the upward and outward movement of atomized electrolyte created by the breaking of gas bubbles. Spewing can occur, for example, during initial formation or on overcharge. Electrolyte spewing is minimized or eliminated because the fibrous or cellular materials filter the atomized mist from the evolving gases. In some flooded systems which are known to gas particularly vigorously, such as alkaline nickel-iron cells, the attenuation material will also filter active material oxides which are spewed from the electrodes, as well as the electrolyte mist. Spewing, of course, is detrimental from the standpoint of electrolyte loss, as well as the corrosive and other hazardous effects of its venting to the atmosphere.

The explosion attenuation materials disclosed herein have been described as being particularly useful in batteries having flooded electrolyte systems. However, there are a variety of secondary storage batteries which operate with an immobilized gelled electrolyte or with a so-called "starved" electrolyte system. In either of these non-flooded systems, the intent is to eliminate free liquid electrolyte within the cells such that the battery can be operated in any attitude without electrolyte loss.

Certain starved electrolyte systems also are constructed to operate on the principle of oxygen recombination such that, during normal operation, evolved oxygen is recombined within the active material of the electrodes and does not accumulate within the battery o have to be vented to the atmosphere. Typically, such batteries are also made with an excess of negative active material in an attempt to prevent the generation of hydrogen gas.

In gelled or starved electrolyte systems, although an open head space is not ordinarily required for the gas-/electrolyte management needed in flooded systems, an open head space is still required to accommodate the cell elements which are similar in batteries of all kinds. Also, notwithstanding the intent in starved or gelled systems to eliminate or reduce the generation of potentially explosive gases, such gases are occasionally evolved in these systems and accumulate, prior to venting, in the open head space. Thus, during formation of these batteries or during unusual circumstances of use, such as inadvertent or abusive overcharge, both hydrogen and oxygen gas may be evolved. Indeed, batteries which utilize a gelled acid electrolyte, oxygen recombination is typically slower than in true recombination systems and hydrogen is also more readily generated even under open circuit conditions. Thus, there is direct applicability of the explosion attenuation concepts described herein in non-flooded systems as well.

In addition, both starved and gelled electrolyte batteries are often initially formed with an ordinary aqueous acid electrolyte. The formation electrolyte is removed or dumped after formation and replaced with a substantially diminished amount of an immobilized operating electrolyte. During formation, however, the same gas/electrolyte management concerns exist as in flooded systems and a bimodal attenuation material provides the same useful benefits. However, as the amount of liquid electrolyte needed to be handled (i.e. present or potentially present in the head space) decreases, the percentage of large pore material needed would also decrease. Of course, if there is never a need to handle free liquid electrolyte in the head space of a battery cell, essentially only the small pore material needed for explosion attenuation would be required.

In addition to the physical properties of materials thus far described which contribute directly to the important bimodal functioning, there are a number of other important characteristics which a material should possess to optimize its utility. The material should have a large total void volume such that it does not occupy too much of the total volume of the headspace. The various materials described herein all possess pore volumes well in excess of 90% and, therefore, result in little loss of natural headspace volume. The material must also have good resilience to retain or return to its original shape after compressive distortion. Such resilience is also characteristics of the materials described. The materials must also possess thermal stability against degradation in the face of the high temperatures potentially encountered in use. In particular, the material should be capable of attenuating explosions and quenching a propogating flame front in a dry atmosphere without burning or sintering. The polyurethane foams described herein have been found to be particularly resistant to sintering, even when repeatedly subjected to gas ignition within a headspace. Finally, the materials must have adequate chemical stability against dissolution or other degradation within the cells. As mentioned previously, polypropylene is known to be highly resistant to dissolution in both aqueous acid and alkaline electrolytes. The polyurethane foams have excellent stability in acid electrolyte, but not in highly alkaline solutions. Storage of these materials in a sulfuric acid electrolyte at 160° F. (71° C.) for more than two months resulted in no physical degradation of the foam and no detection of appreciable dissolved organic material in the electrolyte. Extended field tests in automotive batteries operated under a variety of conditions also resulted in no dissolution or degradation of the material.

Various modes of carrying out the invention contemplated as being within the scope of the following claims particularly pointing out and distinctly claiming the subject matter which is regarded as the invention.

We claim:

1. A method of making an improved electric storage battery of the type having a substantially closed container, electrode elements and an electrolyte disposed within said container, and a head space within said container, said method comprising inserting within said head space a plurality of loosely and randomly distributed pillows of needle punched polypropylene each having at least one bonded segment.

2. The method of claim 1 further comprising the step of randomly enclosing said pillows within a netting prior to insertion into said head space.

* * * * *